June 27, 1967 G. P. COVELL 3,327,837
CLUTCH DRIVE FOR CONVEYOR ROLL
Filed June 17, 1966 2 Sheets-Sheet 1
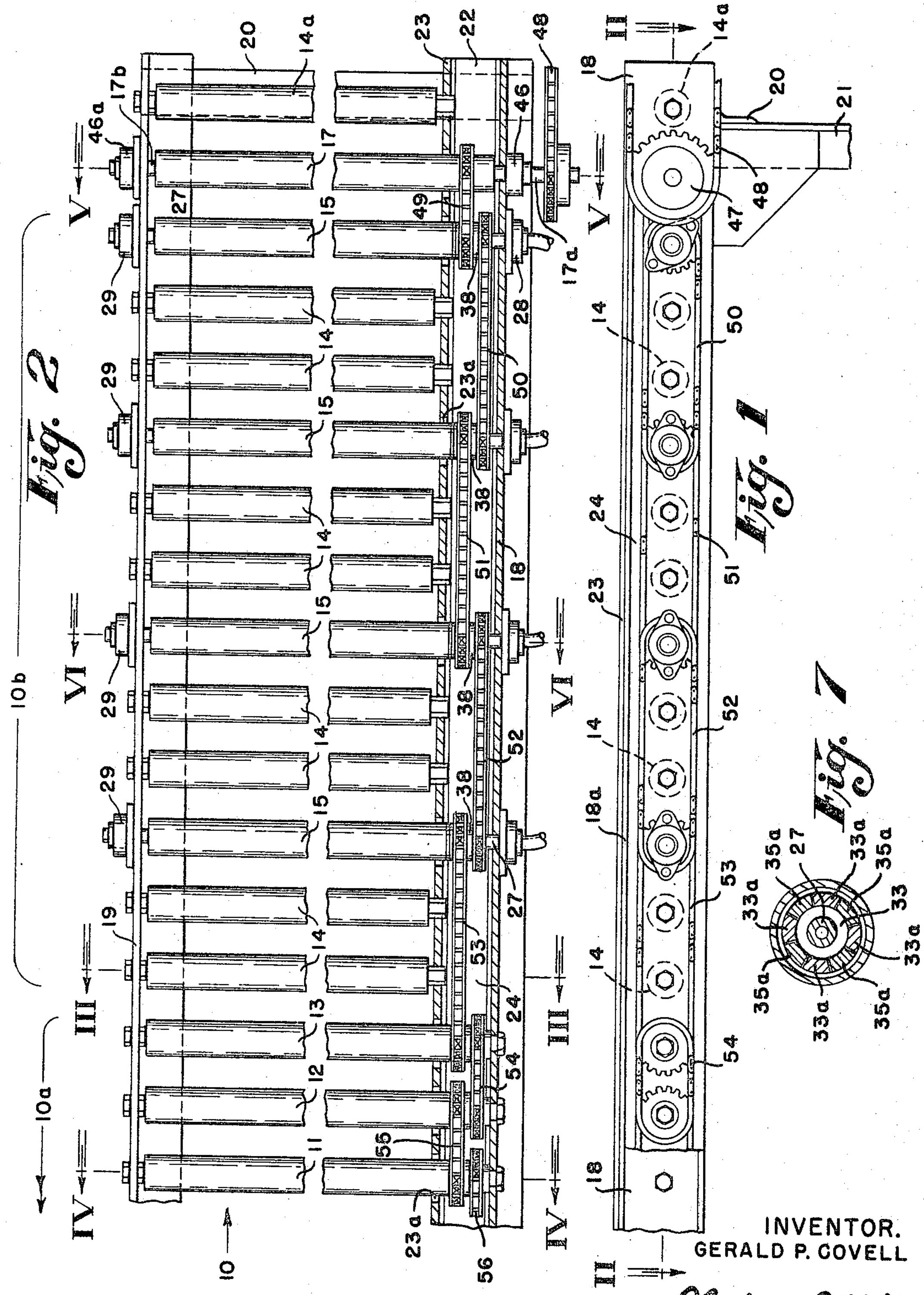
INVENTOR.
GERALD P. COVELL
Norbert P. Holler
ATTORNEY.

June 27, 1967 G. P. COVELL 3,327,837
CLUTCH DRIVE FOR CONVEYOR ROLL
Filed June 17, 1966 2 Sheets-Sheet 2
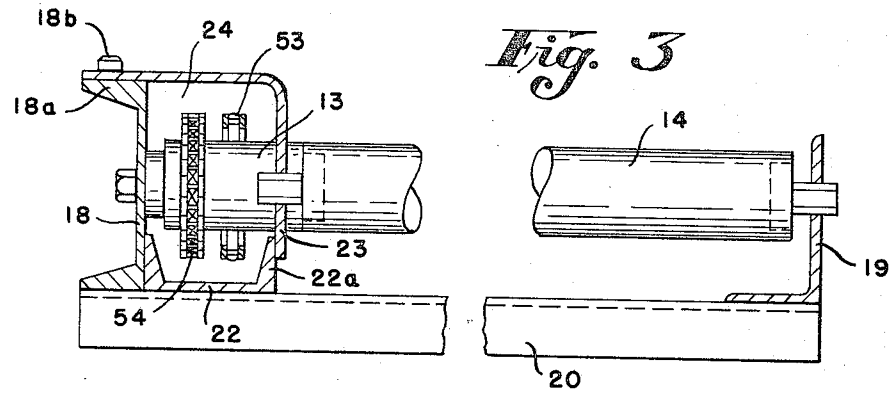
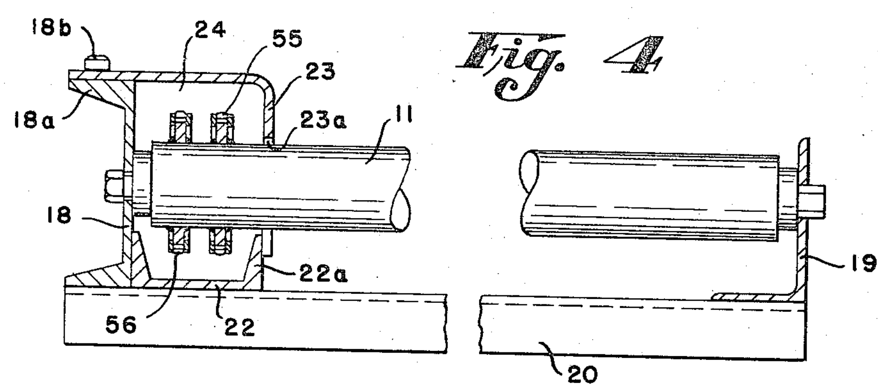
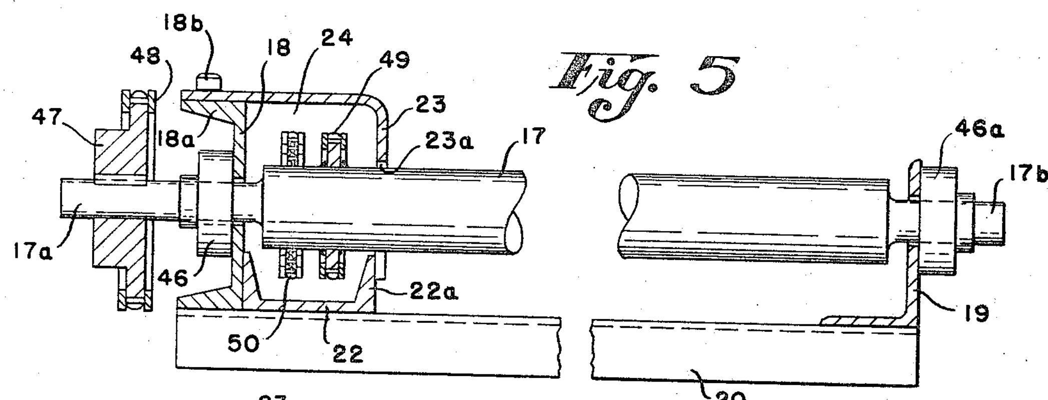
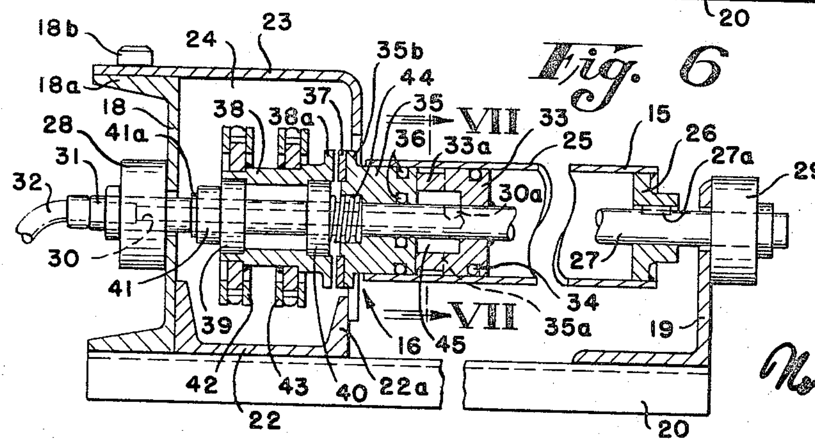
INVENTOR.
GERALD P. COVELL
Norbert P. Holler
ATTORNEY.

United States Patent Office 3,327,837

Patented June 27, 1967

3,327,837

CLUTCH DRIVE FOR CONVEYOR ROLL

Gerald P. Covell, Dearborn, Mich., assignor to Uniroyal, Inc., a corporation of New Jersey Filed June 17, 1966, Ser. No. 558,438
3 Claims. (Cl. 198—127)

This invention relates to roll conveyors, and more particularly to a clutch arrangement for selectively connecting a normally idle or gravity roll of a conveyor to or disconnecting such roll from drive means therefor.

A roll conveyor having a plurality of driven conveyor rolls is sometimes provided with a section of consecutive idle or gravity rolls sufficiently extensive to enable articles being transported to come to rest preparatory to being removed from the conveyor for storage or use. Occasionally it may occur, however, that an article reaching this conveyor section is not ready for immediate use and must be conveyed away for further processing. With all the idle rolls non-driven, attempts to move the article along by hand might entail considerable labor and difficulties, especially if the article is large and/or very heavy.

On the other hand, a roll conveyor may be provided with a plurality of spaced driven rolls and with respective sets of idle rolls arranged between each two adjacent driven rolls, for example to reduce the power input required. This might entail the disadvantage, however, that if an article being conveyed is shorter than the space between any two adjacent driven rolls, it would not be engaged by the second one before leaving the first and thus would come to rest on the intermediate idle roll section.

It is an object of the present invention, therefore, to provide, in a roll conveyor, means through which one or more of the idle rolls in a normally idle conveyor section may be selectively connected with drive means so as to become driven rolls.

A more specific object of the present invention is the provision of a novel fluid-operated clutch for use with a normally idle or gravity roll of a roll conveyor to enable such idle roll to be selectively driven with controlled torque.

The foregoing and other objects, characteristics and advantages of the present invention will be more clearly understood from the following detailed description thereof when read in conjunction with the accompanying drawings, in which:

FIG. 1 is a fragmentary side elevational view of the discharge end region of a driven roll conveyor and a contiguous section of idle rolls some of which are arranged to be selectively driven in accordance with the principles of the present invention;

FIG. 2 is a fragmentary sectional view taken along the line II—II in FIG. 1;

FIGS. 3, 4, 5 and 6 are fragmentary sectional views taken along the lines III—III, IV—IV, V—V and VI—VI in FIG. 2, respectively; and FIG. 7 is a sectional view taken along the line VII—VII in FIG. 6.

Referring now to the drawings in greater detail, the conveyor 10 shown in FIGS. 1 and 2 is, merely by way of example, of the first of the hereinbefore described types, having a main driven roll section **10*a* of which only the last three driven rolls 11, 12 and 13 are shown in FIG. 2, and further having at the discharge end of said main section a contiguous idle roll section 10*b* onto which the driven rolls feed the articles (not shown) being conveyed. In the form of conveyor illustrated in FIGS. 1 and 2, the idle roll section 10*b* comprises a plurality of pairs of idle rolls 14—14 alternating with a plurality of normally idle but selectively drivable gravity rolls 15, each of the latter being associated with a clutch arrangement 16 (FIG. 6) the details of which constitute the substance of the present invention and will be more fully described hereinafter. Following the last of the selectively drivable rolls 15, there is provided in the conveyor section 10*b* a main drive roll 17. An additional idle roll, designated 14*a*, is shown in FIGS. 1 and 2 to indicate schematically that the conveyor section 10*b* may extend beyond the main drive roll 17** or may be followed by another driven roll section.

The frame of the conveyor 10 comprises a pair of longitudinal side rails 18 and 19 rigidly joined to each other by transversely extending angle iron cross members 20 which also interconnect the legs 21 of the conveyor frame. In the illustrated form of the conveyor, the rail 18 is defined by the vertically oriented transverse web of a channel member turned on its side, while the rail 19 is defined by the vertically oriented leg of an angle member. Running lengthwise of the conveyor frame just to the inboard side of the rail 18 is an upwardly facing channel member 22 the inboard flange **22*a* of which abuts against the lowermost edge of the downwardly depending vertical web of an angular housing shield 23 the uppermost horizontal web of which extends outwardly toward the side rail 18 and is secured to the uppermost flange 18*a* of the latter by means of bolts 18*b*. In general, the vertical web of the shield 23 will also be bolted to the flange 22*a* of the channel member 22. The elements 18–22–23 thus define an elongated enclosure 24** which houses the still to be described drive transmission means of the conveyor.

As clearly shown in FIGS. 2 to 6, the side rails 18 and 19 provide the support locations for the opposite ends of the driven rolls 11, 12 and 13, the selectively drivable idle rolls 15 and the main drive roll 17, to accommodate which rolls the inboard wall of the transmission housing 24 defined by the vertical web of the angle member 23 is provided with a plurality of appropriately dimensioned, downwardly facing slot-shaped openings **23*a*. The side rail 19 and the vertical web of the angle member 23 provide the support locations for the shafts of the idle rolls 14**.

Referring now to FIG. 6, each of the selectively drivable rolls 15 comprises a hollow tubular body 25 closed at one end by a hub 26 welded thereto. A transverse shaft 27 extends throughout the roll body 25 and hub 26 and is keyed to the latter at **27*a*. The shaft 27 is journaled at its opposite ends in bearings 28 and 29 supported by the side rails 18 and 19, respectively, and has an axial bore 30 which extends through the shaft from the outermost end thereof and terminates a short distance beyond the vertical web of the member 23 in a radial port 30*a*. A rotary coupling 31 and hose 32 serve to connect the bore 30** with a suitable valve-controlled source of air under pressure (not shown).

The clutch arrangement 16 for each of the rolls 15 comprises an annular member 33 which is welded to the shaft 27 just beyond the port **30*a* and has a circumferentially spaced set of teeth 33*a* (see also FIG. 7) extending therefrom toward the open end of the roll in spaced surrounding relation to the shaft. A fluid-tight seal between the member 33 and the inner surface of the roll body 25 is effected by means of an O-ring 34 or other sealing member carried in an outer peripheral groove of the member 33**.

Slidably mounted on the shaft 27 adjacent to the member 33 is an annular piston 35 which is in fluid-tight sealing relationship to both the interior of the roll body 25 and the exterior of the shaft 27 by means of O-rings or like sealing members 36. At its end facing the member 33, the piston 35 is provided with a circumferentially spaced set of teeth **35*a* (see also FIG. 7) which are slidably received in the spaces between the teeth 33*a* of the member 33. The piston 35 is thus effectively splined to the member 33 for joint rotation while being axially movable relative to said member along the shaft 27**.

The body of the piston 35 extends out of the open end of the roll body 25 through the respective opening in the vertical inboard wall of the housing 24 and at that end has a peripheral radial flange **35*b* to which is affixed an annular friction facing 37. The friction facing 37 is disposed opposite a peripheral radial flange 38*a* of a tubular member or sleeve 38 which is rotatably carried by the shaft 37 through the intermediary of spaced ball bearings 39 and 40, displacement of the latter along the shaft toward the side rail 18 being prevented by means of a collar 41 and locking ring 41*a* secured to the shaft. The sleeve 38 serves as the hub for a pair of sprockets 42 and 43** which are welded to its outer periphery at axially spaced locations.

The piston 35 is normally biased toward the member 33, so as to maintain the friction facing 37 out of contact with the flange **38*a*, by means of a compression spring 44 interposed between the bearing 40 and the piston 35. Due to the presence of the O-rings 34 and 36, of course, a fluid-tight pressure chamber 45 is defined in the roll body 25 between the members 33 and 35, so that the admission of pressure into the chamber 45 causes the piston 35 to be shifted out of its illustrated rest position against the force of the spring 44. This brings the friction facing 37 into contact with the flange 38*a* of the sleeve or hub 38, whereby any rotation of the hub 38 is transmitted to the shaft 27 and thereby to the roll body 25 by virtue of the circumferentially splined connection 33*a*–35*a* between the member 33 and the piston 35. It will be apparent, therefore, that the degree of frictional contact between the facing 37 and the flange 38*a* will depend on, and vary in accordance with, the pressure in the chamber 45. The torque output can thus be readily controlled, for example to suit load requirements, simply by changing the pressure in the chamber 45** accordingly.

Referring now to FIGS. 2 and 5, the trunnions **17*a* and 17*b* of the main drive roll 17 are journaled in bearings 46 and 46*a* supported by the side rails 18 and 19, respectively. Keyed to the outermost end portion of the trunnion 17*a* is the hub of a sprocket 47 which is connected with the source of power for the illustrated conveyor, e.g. an electric drive motor or another piece of driven equipment (not shown), by means of a chain 48. The so-effected rotation of the main drive roll 17 is transmitted to all of the driven elements 38 of the respective clutches 16, and thence to all of the driven rolls 13–12–11 etc., by means of sprocket chains 49 to 56 etc. disposed within the transmission housing 24**.

In operation, when the main drive roll 17 is set into rotation, the driven rolls 11–12–13 etc. of the conveyor rotate continuously, as do the various driven members 38 of the respective clutches 16. Absent any actuation of the clutches, therefore, the rolls 15 remain idle like the rolls 14. Whenever one of the clutches 16 is actuated, however, by the admission of fluid pressure into the respective chamber 45, the resultant axial displacement of the associated piston 35 causes the clutch to be engaged so as to set the associated roll 15 into rotation in the fashion of a driven roll. As soon as pressure is released from the chamber 45, the clutch is disengaged by the spring 44 thereof and the roll 15 again becomes an idle roll. Generally, of course, the operator will have available to him a suitable control panel or selector means to enable him to cause the various clutches 16 to be engaged with predetermined degrees of slippage either singly, or jointly, or sequentially or in any other desired manner depending on the operating requirements of the moment.

Although the conveyor 10 has been described herein as utilizing a single power source to drive both the driven rolls and the selectively drivable idle rolls, it will be understood that the sprocket chain 53 may be eiminated, in which case the power source connected to the drive roll 17 would be utilized only for the selective driving of the idle rolls 15, while the driven rolls 11–12–13 etc. would be connected with a separate power source, e.g. an independent drive motor, provided therefor. Clutched idle rolls 15 of the type disclosed herein may also be incorporated in a roll conveyor having idle roll sections arranged in alternating sequence with the driven rolls thereof, so that if an article being conveyed happens to come to rest between two driven rolls by virtue of being too short to be engaged by a following driven roll before it leaves the region of a preceding one, the operator may actuate the intermediate selectively drivable roll of that idle roll section to cause the article to be advanced and brought into the range of action of the said following driven roll. Still further, all of the rolls of a conveyor may be constructed in the form of the rolls 15, whereby through selective actuation of appropriate controls a specified section or sections of the conveyor may be brought to a halt while other sections continue to run, as might be required in the case of an assembly line set-up, for example. A conveyor utilizing clutch-driven rolls in accordance with this invention would also be advantageous in transporting fragile merchandise, since the fluid pressure to actuate the clutches could be adjusted to provide only enough torque to move the articles and to permit slippage in case of a back-up or jam-up so as to prevent damage to the conveyed articles.

It is to be understood that the foregoing description is for purposes of illustration only, and that the structural and operational features and characteristics of the present invention as disclosed herein are susceptible to a number of changes and modifications none of which entails a departure from the spirit and scope of the present invention as defined by the hereto appended claims.

Having thus described my invention, what I claim and desire to secure by Letters Patent is:

1. A clutch-driven conveyor roll, comprising a rotatable shaft, a roll body secured to said shaft for rotation therewith, first and second annular members carried by said shaft and defining a pressure chamber between said members, said shaft being provided with a bore communicating with said chamber and adapted to be connected with a source of fluid pressure, said first member being fixed to said shaft, said second member being loose on said shaft, means interconnecting said first and second members to inhibit relative rotation therebetween while permitting the latter to slide along said shaft relative to the former, a sleeve supported by said shaft for rotation relative thereto and adapted to be connected with drive means, and interengageable clutching means on said sleeve and said second member, whereby upon admission of fluid pressure into said chamber said second member is displaced axially toward said sleeve to enable said clutching means to engage and to transmit torque from said sleeve to said second member and thence through said first member and said shaft to said roll body.

2. A clutch-driven conveyor roll, comprising a rotatable shaft, a hollow tubular body secured to said shaft for rotation therewith, first and second annular members carried by said shaft within the confines of said body so as to define a pressure chamber between said members, said shaft being provided with a bore communicating with said chamber and adapted to be connected with a source of fluid pressure, said first member being fixed to said shaft, said second member being loose on said shaft, means interconnecting said first and second members to inhibit relative rotation therebetween while permitting the latter to slide along said shaft relative to the former, a sleeve supported by said shaft for rotation relative thereto and adapted to be connected with drive means, interengageable clutching means on said sleeve and said second member, and means operable normally to maintain said second member separated from said sleeve, whereby upon admission of fluid pressure into said chamber said second member is displaced axially toward said sleeve to enable said clutching means to engage and to transmit torque from said sleeve to said second member and thence through said first member and said shaft to said body.

3. A clutch-driven conveyor roll, comprising a rotatable shaft, a hollow tubular body secured to said shaft for rotation therewith, an annular member fixed to said shaft within the confines of said body in fluid-tight relation to both said shaft and said body, an annular piston loosely mounted on said shaft within the confines of said body in fluid-tight relation to both said shaft and said body, said member and piston defining therebetween a fluid-tight chamber, said shaft being provided with a bore communicating at one end with said chamber and adapted to be connected at its other end with a source of fluid pressure, cooperable means on said piston and said member for inhibiting relative rotation therebetween while permitting said piston to slide along said shaft relative to said member, a sleeve supported by said shaft for rotation relative thereto and adapted to be connected with drive means, interengageable clutching means on said sleeve and said piston, respectively, and biasing means operable normally to maintain said piston separated from said sleeve, whereby upon admission of fluid pressure into said chamber said piston is displaced toward said sleeve against the action of said biasing means to enable said clutching means to engage and to transmit torque from said sleeve to said piston and thence through said member and said shaft to said body.

References Cited

FOREIGN PATENTS

| | | |
|---|---|---|
| 922,127 | 1/1947 | France. |
| 964,311 | 7/1964 | Great Britain. |
| 979,413 | 12/1950 | France. |

EVON C. BLUNK, *Primary Examiner.*

R. J. HICKEY, *Assistant Examiner.*